L. P. PHILIPPI.
GAGE FOR CORN PLANTERS.
APPLICATION FILED DEC. 21, 1908.

947,216.

Patented Jan. 18, 1910.

Witnesses:
B. B. Cox
E. Behel.

Inventor:
Louis P. Philippi
By A. O. Behel
Atty.

UNITED STATES PATENT OFFICE.

LOUIS P. PHILIPPI, OF LA CROSSE, WISCONSIN, ASSIGNOR TO MADGE L. PHILIPPI, OF LA CROSSE, WISCONSIN.

GAGE FOR CORN-PLANTERS.

947,216. Specification of Letters Patent. Patented Jan. 18, 1910.

Application filed December 21, 1908. Serial No. 468,564.

*To all whom it may concern:*

Be it known that I, LOUIS P. PHILIPPI, a citizen of the United States, residing at La Crosse, in the county of La Crosse and State of Wisconsin, have invented certain new and useful Improvements in Gages for Corn-Planters, of which the following is a specification.

The object of this invention is to construct a gage to be applied to the furrow openers of corn-planters to regulate the running depth of the openers.

Figure 1:
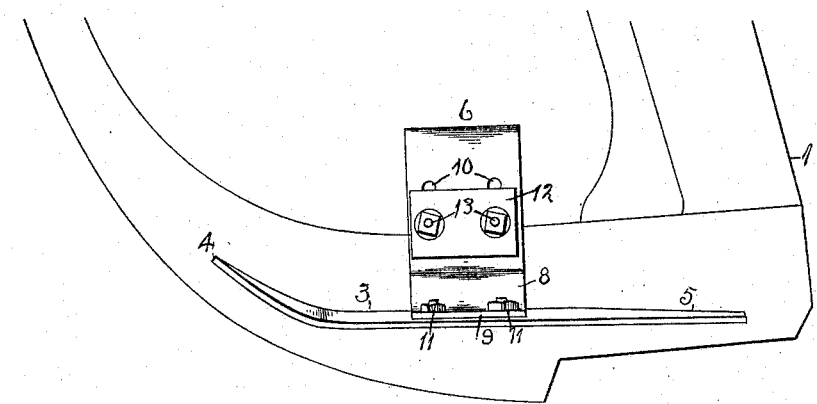
Figure 2:
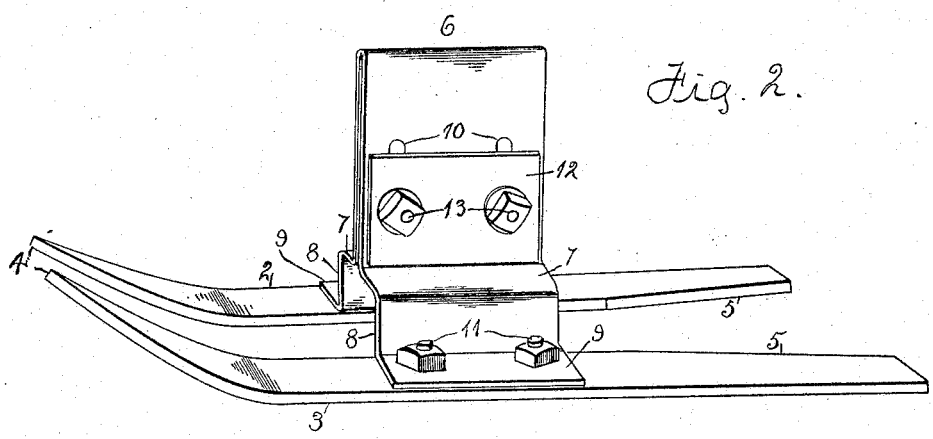
Figure 3:
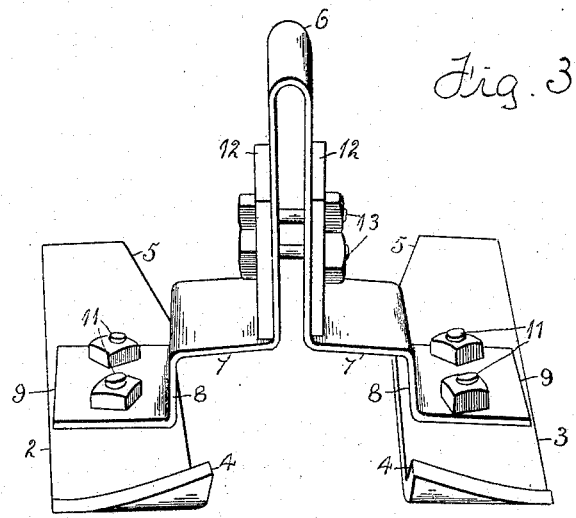

In the accompanying drawings, Figure 1 is a side elevation of the lower portion of a furrow opener of a corn-planter to which my improved gage is connected. Fig. 2 is a perspective view of the gage as seen from the side. Fig. 3 is a perspective view as seen from the front.

The furrow opener 1 is of the usual construction. The gage comprises the two runners 2 and 3 upwardly curved at their front end 4 and pointed, and having their rear ends cut away as at 5 along their inner edges. A yoke 6 is formed with laterally extending sections 7 downwardly extending sections 8, and foot section 9. The yoke is provided with vertically extending slots 10 near the edges. The runners 2 and 3 are connected by the bolts 11 to the feet 9 and are so located with respect to one another that their front ends are nearer together than their rear ends as shown at Fig. 3.

At the outer faces of the yoke 6 are located plates 12 which are connected thereto by the bolts 13 passing through the slots 10 in the yoke and through openings in the plates. In connecting the gage to the furrow opener, the yoke 6 receives the lower branch of the opener so that the bolts 13 will rest on top thereof. The yoke is adjusted vertically in connection with the furrow opener which will carry the runners with it until the runners are the proper distance above the lower edge of the opener; this is accomplished by the slots, and when adjusted, the bolts 13 are tightened which will clamp the yoke to the furrow opener with sufficient firmness to allow the furrow opener to penetrate the ground until the runner rests upon the ground. By this arrangement the depth at which the furrow openers penetrate the ground may be regulated.

By separating the runners from the furrow opener, turning the runners upward at their forward end and pointing them, trash will pass between the runners and furrow openers and will pass beneath and outside of the runners in order that all clogging is obviated. The vertical sections 8 of the yoke in connection with the horizontal portions 7 forms an arch above the runners so that trash will more freely clear the runners, and the cut-away rear inner portions of the runners give greater clearance.

This gage can be applied to planters now in use.

I claim as my invention.

1. The combination of a furrow opener, a gage comprising a support having laterally extending sections, means for fastening the support in connection with the furrow opener, and runners connected to the sections and spaced from the furrow opener.

2. The combination of a furrow opener, a gage comprising a yoke, the lower ends of which are bent outwardly, downwardly and then outwardly, runners connected to the last mentioned outwardly extending portions whereby the runners are spaced from the furrow opener, and means for fastening the yoke to the furrow opener.

In testimony whereof I have hereunto set my hand in presence of two subscribing witnesses.

LOUIS P. PHILIPPI.

Witnesses:
J. E. HIGBEE,
CLARA E. ANDREWS.